(12) United States Patent
Maul

(10) Patent No.: US 8,313,363 B2
(45) Date of Patent: *Nov. 20, 2012

(54) METHOD FOR CONDUCTING SPORTS TOURNAMENTS WITH WAGERING

(75) Inventor: Kenneth L. Maul, Las Vegas, NV (US)

(73) Assignee: World Series of Golf, Inc., Las Vegas, NV (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/912,794

(22) Filed: Oct. 27, 2010

(65) Prior Publication Data

US 2011/0053712 A1 Mar. 3, 2011

Related U.S. Application Data

(63) Continuation of application No. 10/958,933, filed on Oct. 5, 2004, now Pat. No. 7,841,933.

(51) Int. Cl.
*A63F 9/24* (2006.01)
*A63F 13/00* (2006.01)

(52) U.S. Cl. .................. 463/7; 463/16; 463/25; 700/91; 473/409

(58) Field of Classification Search .................. 463/3, 7, 463/9, 16, 25, 29, 36, 40–42; 700/91–93; 473/409; 434/252

See application file for complete search history.

(56) References Cited

U.S. PATENT DOCUMENTS

| 3,685,832 A | 8/1972 | Johnson |
| 5,043,889 A | 8/1991 | Lucey |
| 5,332,218 A | 7/1994 | Lucey |
| 5,333,874 A | 8/1994 | Arnold et al. |
| 5,505,457 A | 4/1996 | Boylan et al. |
| 5,603,502 A | 2/1997 | Nakagawa |
| 5,779,242 A | 7/1998 | Kaufmann |
| 6,007,427 A | 12/1999 | Wiener et al. |
| 6,425,828 B2 | 7/2002 | Walker et al. |
| 6,688,978 B1 | 2/2004 | Herman |
| 6,767,282 B2 | 7/2004 | Matsuyama et al. |
| 6,955,611 B2 | 10/2005 | Kimmel |
| 2002/0123377 A1 | 9/2002 | Shulman |

(Continued)

OTHER PUBLICATIONS

Ng, Daniel; "Games Golfers Play"; Insider Guide to Golf Courses in Asia [retrieved on Apr. 6, 2007]. Retrieved from the Internet: <URL: http://www.golf-asia.com/archive/articleothers/golfbets.html>.

(Continued)

*Primary Examiner* — Milap Shah
(74) *Attorney, Agent, or Firm* — Kevin J. Snyder; John V. Stewart

(57) ABSTRACT

A multi-level single elimination sports tournament with wagering for a field of players divided into groups of generally equal size. Each group competes within itself in a series of play sequences, such as a series of golf holes. Each play sequence comprises at least one competitive play action toward a goal, such as one or more golf strokes toward a hole. The players wager after each play action on their expected results in the current play sequence. Players are eliminated when they can no longer meet a minimum ante on the next play sequence. A round of the tournament is completed when only a single player remains in each group. The survivors are divided into new groups for another round. This continues until a last round that has only one group. A single winner survives, and is awarded most of the pot.

7 Claims, 1 Drawing Sheet

U.S. PATENT DOCUMENTS

| | | | |
|---|---|---|---|
| 2002/0156649 A1* | 10/2002 | Edgar | 705/1 |
| 2002/0173386 A1* | 11/2002 | Jeske | 473/409 |
| 2003/0011130 A1 | 1/2003 | Bennett | |
| 2003/0050112 A1 | 3/2003 | Leen et al. | |
| 2003/0052454 A1 | 3/2003 | Leen et al. | |
| 2003/0160387 A1 | 8/2003 | Drury | |
| 2003/0236110 A1* | 12/2003 | Beaulieu et al. | 463/1 |
| 2004/0023734 A1 | 2/2004 | McClain | |
| 2005/0049731 A1* | 3/2005 | Dell | 700/91 |
| 2006/0246983 A1* | 11/2006 | Huard et al. | 463/16 |
| 2008/0167117 A1* | 7/2008 | Moshal et al. | 463/25 |
| 2010/0210362 A1* | 8/2010 | Toompere | 463/42 |

OTHER PUBLICATIONS

Centrebet Pty Ltd; "Centrebet Golf Betting—Season 2003 Preview" via www.archive.org [Jun. 22, 2003] [retrieved on Apr. 6, 2007]. Retrieved from the Internet: <URL: http://web.archive.org/web/20030622075113/http://www.centrebet.com/golf-betting.php>.

\* cited by examiner

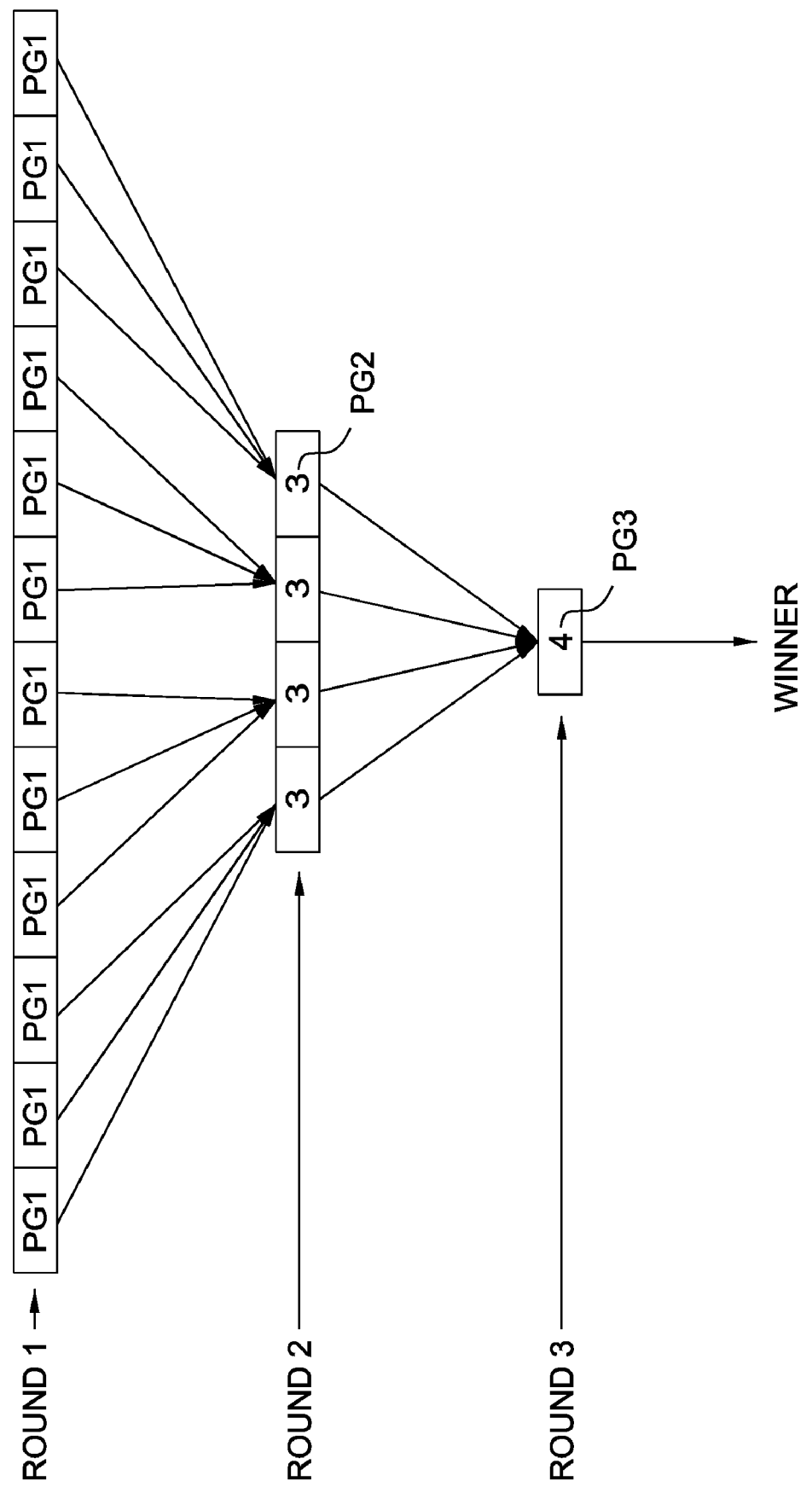

METHOD FOR CONDUCTING SPORTS TOURNAMENTS WITH WAGERING

CROSS-REFERENCE TO RELATED APPLICATIONS

This application is a continuation of U.S. patent application Ser. No. 10/958,933 filed on Oct. 5, 2004, now U.S. Pat. No. 7,841,933 and claims benefit thereof under 35 USC 120.

FIELD OF THE INVENTION

This invention relates to sport tournament formats with wagering, especially for golf tournaments.

BACKGROUND

US 2004/0023734 (McClain Feb. 5, 2004) "Real-Time Worldwide Wireless Golf Competition Network" describes a method and system for real golf competition (as opposed to virtual competition) among players who may be remotely located from each other. Golf stroke/hole results are entered and shared in real time using Personal Digital Assistants (PDAs) or other portable digital telecommunications devices at each site. Players with different skill levels, and courses/holes of different difficulties are normalized using golfer handicapping and course/hole ratings. Thus a wide range of players can compete fairly head-to-head from different courses. Wagering is provided via member accounts and electronic funds transfers, using member log-in identification and verification.

McClain's system could not be used to manage the present sports tournament format. The present format is a type of single elimination, but McClain lacks a single-elimination model entirely, and lacks the grouping and rounds structure of the present format. A network as used in McClain is not needed by the present format, although such a network would be useful. However, McClain would need major unsuggested modifications to support the present format. McClain is designed for head-to-head competition. It can also track overall season statistics for each player, providing a virtual "tournament" of sorts for a whole season.

US 2003/0160387 (Drury Aug. 28, 2003) "Hole, Course, or Tournament Style Golf Game" is mainly a game of chance, with a little skill. Dice or other "chance means" determine the advancement of a simulated golf ball on a board or display. This has nothing to do with golfing skill, and could not be used to conduct a real golf tournament. It only requires a basic understanding of probability. Wagers can optionally be placed on the winner of a given hole, the winner of the game, or on a specific result of a dice throw. In contrast, the present format is mainly a game of golf skill, with a little luck in the order of play, and the order of betting, and much luck in the partners assigned.

U.S. Pat. No. 5,779,242 (Kaufmann Jul. 14, 1998) "Method for Players to Play a Tournament of Games where Game Scores are Obtained" describes a modified double-elimination format. No wagering is mentioned, although methods of portioning prize money are provided. In contrast, the present invention is a type of single-elimination format, and wagering is a major element.

U.S. Pat. No. 6,688,978 (Herman Feb. 10, 2004) "Event Contest Method" describes a method of playing a prediction game in which participants of the method predict winners or high scorers in a pool of contestants, which may be individuals or teams. The participants are not themselves the contestants, but simply predict, and optionally bet on the outcome of the predictions. To determine the outcome, a performance index of each participant is calculated for his/her selected set of contestants by cumulative statistics such as wins, scores, or performance data such as RBIs, hits, etc. for baseball. In contrast, in the present format, the participants are also the contestants, and the outcome of each hole of golf, and therefore of each wager, is determined by golfing skill. Also in contrast, in the present format, participant-contestants are eliminated from participation as each round is completed.

SUMMARY OF THE INVENTION

An object of the invention is provision of a format and method for conducting large sport tournaments with wagering, in which the participants are both the contestants and the wagerers, requiring skill in a given sport and in wagering. Another object is flexibility in accommodating different numbers of players, different facilities and time frames, and in adjusting for last-minute cancellations without a significant delay in the tournament start time. Another object is usefulness for both real and virtual competitions.

These objects are achieved in a multi-level single elimination sports tournament with wagering for a field of players divided into groups of generally equal size. Each group competes within itself in a series of play sequences, such as a series of golf holes. Each play sequence comprises at least one competitive play action toward a goal, such as one or more golf strokes toward a hole. The players wager after each play action on their expected results in the current play sequence. Players are eliminated when they can no longer meet a minimum ante on the next play sequence. A round of the tournament is completed when only a single player remains in each group. The survivors are divided into new groups for another round. This continues until a last round that has only one group. A single winner survives, and is awarded most of the pot.

BRIEF DESCRIPTION OF THE DRAWINGS

FIG. 1 is a schematic view of an example tournament format according to the invention having PG1 players per group in round 1, three players per group in round 2, and four players per group in round 3.

REFERENCE NUMBERS

PG1. The number of players in each group in round 1.
PG2. The number of players in each group in round 2.
PG3. The number of players in each group in round 3.

TERMINOLOGY

Button—The player in each group who currently opens the betting for a given hole or play sequence is said to have the "button". A physical button, such as a pin or clip for a player's shirt may be used, or a mark on a score sheet may be used. A chance selection means is used to determine the order of play per group per round. The button starts with the first player in the group, and rotates in sequence among the other players in the group after each hole according to their order of play.

Group—A group is a subset of players in a round of the tournament. A group is a separate competitive entity within itself during a round, until all players but one are eliminated from each group. The winners from each group are then regrouped for the next round. Group sizes can be different in different rounds, but are preferably all the same in a given round.

Field—The total players starting a given round of the tournament. The first round starts with all players who have entered the tournament. Subsequent rounds start with increasingly reduced fields.

Play Sequence—A series of one or more competitive play actions by a player toward a goal. For example, a hole of golf is a play sequence, and a stroke is a competitive play action toward the goal of holing the ball.

Round—A level of eliminations. Each round eliminates a known number of players after they lose their money in wagering within groups of competing players. The first round starts with all players. Each subsequent round starts with the surviving players from the previous round in newly arranged groups.

Survivor—The winner in a group during a round of competition after the other players in the group have been eliminated by losing their wagering money to the survivor.

DETAILED DESCRIPTION

The invention is a multi-level elimination sports tournament format with a method of wagering by the players on their own results during competition. The tournament starts with a field of players. The field is divided into subsets or groups. Each group has a given number of players. The tournament is played in multiple rounds. Each group is a separate competitive entity within itself during a given round. The players of each group compete with each other in a sport such as golf, and they wager against each other on their play results as described below. The wagering method eliminates all but one player in each group. The end of a round occurs when there remains only a single survivor per group.

If PG is the number of players in each group in a given round, then the percentage of players eliminated in the given round is ((PG−1)/PG). For example, if there are 6 players per group in round 1, then 5 players will be eliminated per group in round 1, which is ⅚ of the field. This format allows rapid reduction of a large field. The group sizes and number of rounds for a given tournament are decided in advance, based on the expected size of the field and the facilities and time available for running the tournament. All the groups in a given round are the same size at the time of invitation to the tournament. However, depending on the actual starting field after entries, cancellations, and replacements, the group sizes may be adjusted. Some groups may be smaller than the nominal size for a given round by one player. This allows high flexibility in running a tournament, and in making last-minute adjustments without delaying the start time.

In standard major golf tournaments, cuts are made after one or more rounds of a certain number of holes. In the present format, players are eliminated after they lose their wagering money and they cannot ante on the next hole. This may occur at different rates in different groups, so a round in the present specification is not defined by a set number of holes of golf or a set number of competitive sequences in general, but by the elimination of all but one player in each group.

The surviving players from a given round of the tournament constitute the field of players for the next round. These surviving players are regrouped, and again compete and wager within their groups, until again one player survives from each group. This hierarchy of successive eliminations continues until a final round is played in which there are only enough players for one group. The survivor of this group is the winner of the tournament.

This tournament format is especially appropriate for golf, but it can be used for any competition having a series of play sequences, each sequence comprising at least one competitive play action performed by each player in a group, and each sequence providing a quantitative measure of success by each player in the group.

When applying the present format to the sport of golf, the series of play sequences is the series of holes played, the play actions are the strokes toward a hole, and the measure of success is the number of strokes for a given hole. For clarity, the following description is in golf terms, but the present format and method can be generalized to include other types of competitive play.

The wagering terms for the present method are as follows: An ante is required for each hole. Players wager on the current hole after each stroke is completed by all players in the group. Players may go "all in" even if they cannot match a bet. Ties will split the pot. In the event that everyone in a group ties a hole, the antes will carry over to the next hole. Players are eliminated when they cannot ante on a hole. They may not buy back in. In the event of an "all-in" tie that results in the combined ante carried over, a contestant will not be eliminated for being unable to meet the minimum new ante. He will play that hole as "all-in".

The required ante preferably increases gradually during a round. For example, it may increase by a predetermined amount, such as a given fraction of the buy-in, after every hole. The player with the button starts the betting on each hole. He can bet, pass, or fold. The second player in line for the button may raise the bet, accept the bet (i.e., check the bet) or fold. The third and forth players in line may also accept the bet, raise the bet or fold). This can happen after each shot until the hole is completed. After each hole the button passes to the next player.

Example

Following is an example of a golf tournament conducted according to the present invention for a starting field of 432 players. To begin each round, the field is divided into groups. Each group is a separate competitive entity within itself. A dealer is provided for each group to track wagers made by the players. A chance selection method such as a drawing is used at the first hole to determine the play order within a group. The first player of the group controls the bet on the first hole, and is said to have the "button". The second player controls the bet on the second hole. The "button" is said to pass to the second player. The third player controls the bet on the third hole. The fourth player of the group controls the bet on the fourth hole. Then the rotation starts again with the first player on the fifth hole, and so on until the end. On par fours and fives a first bet made after the first shot is made by all players in the group. On par threes a first bet is made before the first shot.

Round 1: Each player buys-in to the tournament with a given amount, or bank of $10,000. The starting field is divided into 108 foursomes. The ante starts at $500 and increases $200 each time the button passes, which is every hole. On hole one the ante is $500, on hole two the ante is $700, on hole 3 the ante is $900, on hole 4 the ante is $1,100 and so on. The minimum bet is $200. Players can go "all-in" at any time. The match continues until only one player remains per foursome to play the next round.

Round 2: Each player's bank is $40,000. The 108 surviving players from round 1 are divided into threesomes. The ante starts at $2,000 and increases $500 each time the button passes, which is every hole. The minimum bet is $500. Players can go "all-in" at any time. The match continues until only one player remains per threesome to play the next round.

Round 3: Each player's bank is $120,000. The 36 surviving players from round 2 are divided into sixsomes. The ante starts at $6,000 and increases $2,000 each time the button passes, which is every hole. The minimum bet is $2,000. Players can go "all-in" at any time. The match continues until only one player remains per sixsome to play the next round. Round 4: Each player's bank is $720,000. The six surviving players from round 3 will play in one sixsome. The ante starts at $40,000 and increases $10,000 each time the button passes, which is every hole. The minimum bet is $10,000. Players can go "all-in" at any time. The match continues until the tournament winner is determined.

Prize money is preferably awarded to the survivors of each round based on a percentage of the total purse for that round in accordance with a payout schedule provided in advance by the tournament organizers. The players in the final round are preferably awarded prize money for that round based on their final placement in that round.

The present format and method can be used for either real or virtual competition. It is useful for actual large golf tournaments. It is also usable for virtual competition on a computerized system with multiple play stations, either at the same location or networked over multiple remote locations. The play actions can be simulated golf strokes on a simulated golf course. The simulated golf course is preferably based on a digital model of a real golf course that is selectable at the start of play. The results of simulated play actions can be determined by chance, using computerized randomization and simulation techniques to project a ball imperfectly toward a hole relative to the last shot. Or the play actions can be based on skill using a digitizing manual input device that gives the player manual control over the simulated trajectory of a ball. This digital input device can be one or more of a lever, plunger, wheel, knob, pedal, or even a golf club with transmitting accelerometers and/or other stroke digitizing means. The details of such input devices are not part of this invention. Preferably the simulated play action should model the slopes and speeds of real courses and greens under actual conditions of varying weather. The play actions preferably simulate golf, but they can alternately be a simulation of any other real or imagined sport, including various types of pinball.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. A method for conducting a physical sport tournament with wagering for a field of players competing in multiple rounds, comprising the steps of:
   a) each player providing a buy-in amount of money for wagering;
   b) dividing the field into one or more groups of generally equal size;
   c) each group competing within itself in a series of play sequences, each play sequence comprising at least one play action made by each player of the group that produces a result based on physical skill in a sport toward a goal;
   d) each player wagering a portion of the buy-in amount after each play action of physical skill on expected results in the current play sequence versus the other players in the same group;
   e) each play sequence having a minimum wager of an ante amount from the buy-in amount required of each player, and after each play sequence, resolving wagers placed by each of the players in the group, thereby either increasing or decreasing each player's buy-in amount;
   f) players being eliminated when they can no longer meet the minimum ante amount on a next play sequence in a current round;
   g) each round of the physical sport tournament being completed when a single player survives elimination in each group;
   h) the survivors of the current round defining a new field of players that is divided into new groups for at least one next round of the physical sport tournament; and
   i) recursively repeating steps b) through h) for additional rounds until a last round is played that has only one group and a single winner survives.

2. The method of claim 1, wherein said at least one play action is a golf stroke physically made by each player toward a golf hole.

3. The method of claim 1, wherein each play sequence comprises at least one golf stroke made by each player using a golf club to sink a golf ball in a golf hole.

4. A method of conducting a physical sport tournament with wagering for a starting field of players, comprising the steps of:
   a) each player of the field of players providing a buy-in amount representing an amount of money called a "bank";
   b) dividing the field into groups, each group having at least two players;
   c) providing a means of competing among the players within each group in a series of play sequences, each play sequence comprising at least one competitive play action that produces a result based on a physical skill in a sport directed toward a goal taken by each player, and providing a quantitative measure of success for each player toward achieving the goal in each play sequence;
   d) using a chance selection means before a current round to select an order of play within each group, resulting in a first through a last player in each group;
   e) in the current round after the first player performs the play sequence, rotating the play order forward by one player in circular fashion;
   f) the players within each group competing and wagering against each other in the order of play;
   g) each player's bank being increased by any wagers won or reduced by any wagers lost by each player during the current round;
   h) each player within each group wagering on the quantitative results of each play sequence performed by that group, each wager being the sum of any required ante plus any additional wagers placed by that player during each play sequence;
   i) each player being required to ante a predetermined amount of the player's bank on each play sequence;
   j) after each competitive play action, each player being allowed to place the additional wager or modify any previously placed wagers on the quantitative results of each given play sequence, except after a last competitive play action in the given play sequence, the total of the ante and the additional wager being limited to that player's remaining bank amount;
   k) each play sequence having a minimum amount for the additional wager that can be wagered by a player;
   l) players in each group being eliminated from the physical sport tournament when that player has less in their bank than the lesser of any required ante or any required minimum amount for the additional wager on the next play sequence to be performed by the group in the series of play sequences;

m) each group of players competing and wagering in the series of play sequences, said series comprising the current round of the tournament until only one player survives in each of the groups, the set of surviving players being a new field for a next round of the physical sport tournament;

n) recursively repeating steps b) through m) for additional rounds of the physical sport tournament until only one player survives as the physical sport tournament winner and the wagering winner.

5. The method of claim 4, wherein said at least one competitive play action is a golf stroke physically made by each player toward a golf hole.

6. The method of claim 4, wherein:

each competitive play action is a golf stroke;

the goal of each competitive play action is to sink a golf ball in a golf hole;

each play sequence in the series of play sequences includes at least one golf stroke made by a given player until a golf ball of the given player sinks in a given golf hole; and the quantitative measure of success is a number of golf strokes required by the given player to sink the golf ball of the given player in the given golf hole.

7. The method of claim 4, wherein each play sequence comprises at least one golf stroke made by each player using a golf club to sink a golf ball in a golf hole.

* * * * *